United States Patent

[11] 3,579,285

[72] Inventor Emile Joseph-Henri Verdier
 St. Laurent, Quebec, Canada
[21] Appl. No. 751,668
[22] Filed July 18, 1968
[45] Patented May 18, 1971
[73] Assignee Aktiebolaget Bofors
 Bofors, Sweden
[32] Priority May 8, 1964
[33] Canada
[31] 902,304
 Pat. 726500
 Continuation-in-part of application Ser. No.
 452,125, Apr. 30, 1965.

[54] HYDRAULIC ANTITHEFT SYSTEM FOR VEHICLES
 12 Claims, 23 Drawing Figs.

[52] U.S. Cl. ................................................. 307/10
[51] Int. Cl. ................................................. B60r 25/08
[50] Field of Search .................................... 307/10

[56] References Cited
UNITED STATES PATENTS
3,174,502  3/1965  Howarth et al. ............. 307/10X Primary Examiner—Oris L. Rader
Assistant Examiner—W. E. Duncanson, Jr.
Attorney—Robert G. Hendry ABSTRACT: An antitheft apparatus for use on a vehicle comprising a key operated valve adapted to retain fluid in the brake lines of the vehicle so that the brakes remain applied. The valve for use in the system being specially formed so that fluid pressure tending to hold the valve closed will not make it difficult to turn the key to open the valve.

Patented May 18, 1971

HYDRAULIC ANTITHEFT SYSTEM FOR VEHICLES

This is a continuation-in-part of U.S. application Ser. No. 452,125 filed Apr. 30, 1965. This invention relates to antitheft devices and more particularly to an antitheft device for motor vehicles. The increasing number of thefts of automobiles and other vehicles is a well-known problem, and it is evident that the conventional ignition locks and door locks provide inadequate protection against such thefts.

It is, therefore, a feature of the present invention to provide an antitheft device capable of locking the hydraulically operated brakes of a motor vehicle.

Another feature of this invention is the provision of a hydraulically operated lock to secure the hood of a vehicle.

A further feature of this invention is provision of means to cause the vehicle's horn to be actuated if the hood is forced open, or the device is tampered with.

A still further feature of this invention is the provision of means to render the vehicle's ignition system inoperative.

The present invention also provides an antitheft apparatus for use with a vehicle having hydraulically operated brakes comprising a key-operated valve adapted to retain hydraulic fluid in brake lines of the vehicle whereby the brakes remain applied while the vehicle is unattended.

Accordingly, the present invention also provides an antitheft apparatus for use in a motor vehicle having fluid operated brakes, a source of pressure and a conduit from the source of pressure to the brakes, a second conduit interconnecting said source of fluid and a fluid operated hood latch, said apparatus comprising a shaft, a normally closed first valve so positioned in said conduit as normally to prevent release of said brakes when said brakes have been applied, first valve actuating means associated with said shaft and operative to open said first valve; a second normally closed valve in said second conduit said second valve being so positioned as normally to prevent release of said hood latch; and second valve actuating means associated with said shaft to open said second valve; and locking means to prevent rotation of said shaft whereby said first valve is prevented from being moved to an open position to allow return of fluid trapped in said first conduit, and whereby said second valve is prevented from being moved to an open position by said shaft to allow fluid to pass through said second conduit to release said hood latch.

In the drawings which illustrate embodiments of the invention:

Figure 1:
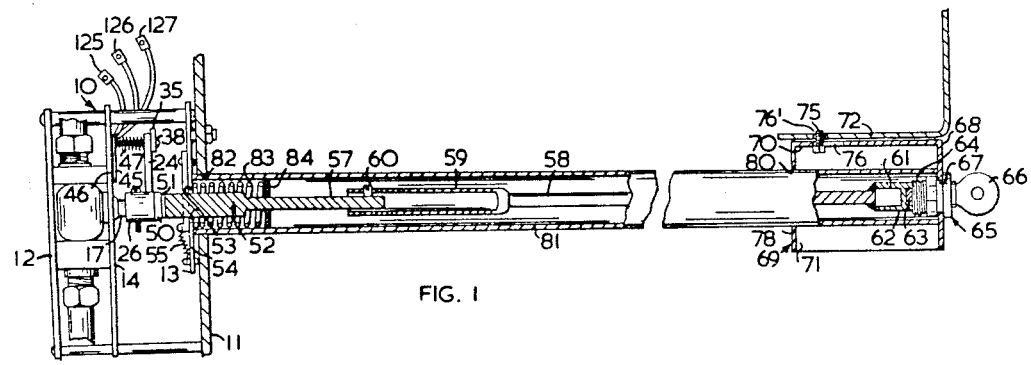
FIG. 1 is a partly sectional side elevation view of the control box and lock of the antitheft device in accordance with this invention.
Figure 2:
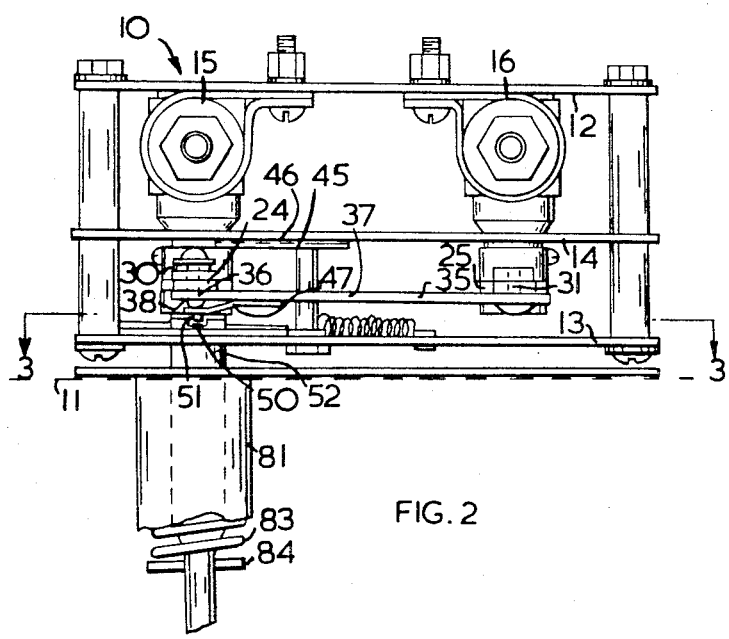
FIG. 2 is a top plan of the control box of FIG. 1.

Referring now in detail to the drawings, a control box indicated generally at 10 in FIGS. 1 and 2 is adapted to be secured to a firewall 11 within the engine compartment of a motor vehicle.

Figure 6:
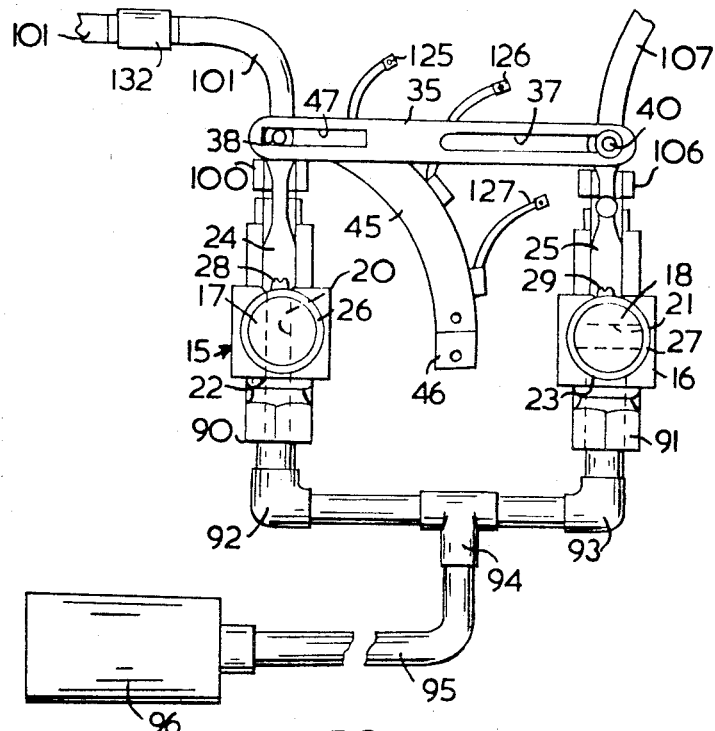
FIG. 6 is a front elevational view of the valves of the control box of FIG. 1 and the associated linkage and electrical and hydraulic connections.
Figure 7:
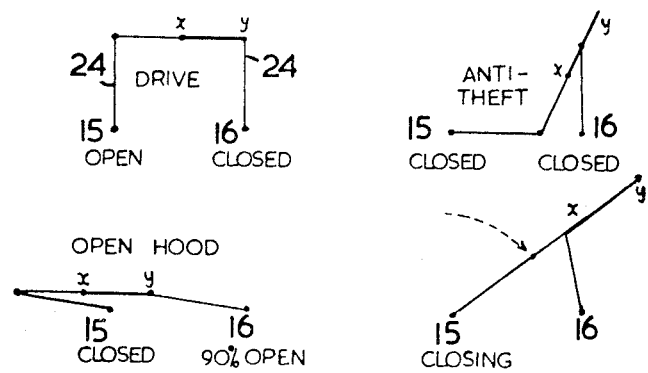
FIG. 7 is a diagrammatic representation of the various positions of the valves and linkage of FIG. 6.

The box 10 comprises two spaced-apart plates 12 and 13 and an intermediate plate 14. Two valves 15 and 16 are secured to the plate 12 in any convenient manner. The valves 15 and 16 have rotatable stems 17 and 18 respectively, each of which extends through a suitable aperture in the intermediate plate 14. It is important that the valves 15 and 16 be of a type which closes fully at two positions located diametrically opposite to each other and open fully at an intermediate position. As illustrated in FIG. 6, the rotatable valve stems 17 and 18 are provided with apertures 20 and 21, respectively adapted to be aligned with passages 22 and 23 extending through the valves, thus providing a continuous passage therethrough when the valve stems are rotated to the open position.

The valve stems 17 and 18 have arms 24 and 25 respectively secured thereto at right angles. In the embodiment illustrated, the arms 24 and 25 are welded or otherwise secured to sleeves 26 and 27 respectively, which receive the stems 17 and 18 and are secured thereto by pins 28 and 29 passing therethrough. The free ends of arms 24 and 25 are provided with apertures 30 and 31 respectively (see FIG. 2).

A link 35 having an aperture 36 (see FIGS. 2 and 6) at one end thereof and an elongated slot 37 at the other end thereof extending to approximately the midportion, interconnects the two arms 24 and 25. A pin 38 extends through the aperture 36 in the link 35 and through the aperture 30 in the arm 24. It will be noted that the pin 38 extends to a point adjacent the intermediate plate 14 for purposes to be described below.

A rivet 40 passes through the slot 37 in the link 35 and through this aperture 31 in the arm 25.

An arcuate contact plate 45 is secured to the plate 14 of the control box and insulated therefrom by a similarly shaped member 46 of insulating material. The contact plate 45 is so positioned as to extend along the path traced by the pin 38 associated with the arm 24. A leaf spring 47 acting on the pin 38 biases the enlarged inner end 48 of the pin toward the contact plate 45 (see FIG. 2).

Figure 3:
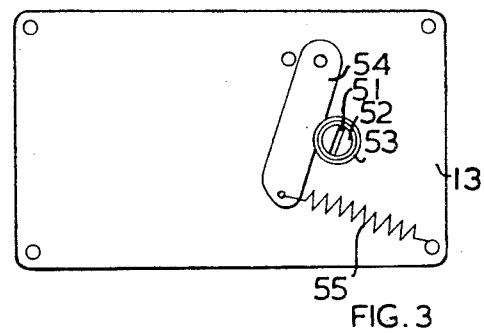
FIG. 3 is a section taken along the line 3-3 of FIG. 2.

As shown in FIGS. 1 and 3, the sleeve 26 is provided at its outer end with a diametric bar or key 50 adapted to be received in a slot 51 in one end of a shaft 52 extending through an aperture 53 in the plate 13 of the control box 10.

It will be noted that the aperture 53 is adapted to be closed by a door 54 pivotally secured at its one end to the plate 13. A helical spring 55 secured to the other end of the door 54 biases the door towards the aperture 53. It will be appreciated that unless the end of the shaft 52 is extending through the aperture 53, the helical spring 55 will cause the door 54 to cover the aperture 53.

The shaft 52 comprises two telescoping sections 57 and 58 in order to facilitate installation of the device on the various makes and models of vehicles. The section 57 is received in a tubular member 59 secured to one end of the section 58 and secured therein by a set screw 60 in a conventional manner. The other end of the telescoping section 58 is provided with a cylindrical sleeve 61 which has a diametrically positioned bar 62 secured therein to cooperate with a slot 63 in the end of a rotatable barrel 64 of a lock 65.

The lock 65 is of the type manufactured by the Pinkerton Company and is of the "Electro-security" type. The barrel 64 of the lock 65 is adapted to be turned by a key 66. The lock 65 is secured in an aperture 67 in an end wall 68 of a box 69. The box 69 has a bottom 70 and an open top 71 and is inverted so that the bottom 70 is securable to a portion of the instrument panel 72 of the vehicle by a suitable machine screw 75 extending through a suitable elongated aperture 76 in the bottom of the box 69 and into a threaded aperture 76 in the instrument panel 72.

An end wall 78 of the box 69 is provided with an aperture 80 which is aligned with the aperture 67 in the end wall 68. The aperture 80 is adapted to receive a cylindrical tube through which the shaft 52 extends.

The cylindrical tube 81 bears at its one end against the inner surface of the end wall 68 of the box 69. The other end of the tube 81 extends through a suitable aperture 82 in the firewall 11 of the motor vehicle and is welded to the outer surface of the plate 13. It will be noted that the aperture 53 is of lesser diameter than the internal diameter of the tube 81. A helical spring 83 surrounding the shaft 57 bears at its one end against the plate 13 and at its other end against the collar 84 carried by the shaft 57.

To install the control box 10, the shaft 52 and the lock 65 of the antitheft device in a motor vehicle, it is necessary to first secure the box 69 containing the lock 65 to the instrument panel 72. Then the tube 81 including the shaft 52 therein is inserted through the firewall 11 so that its free end is received in the box 69. The control box 10 is then secured to the firewall 11.

Figure 5:
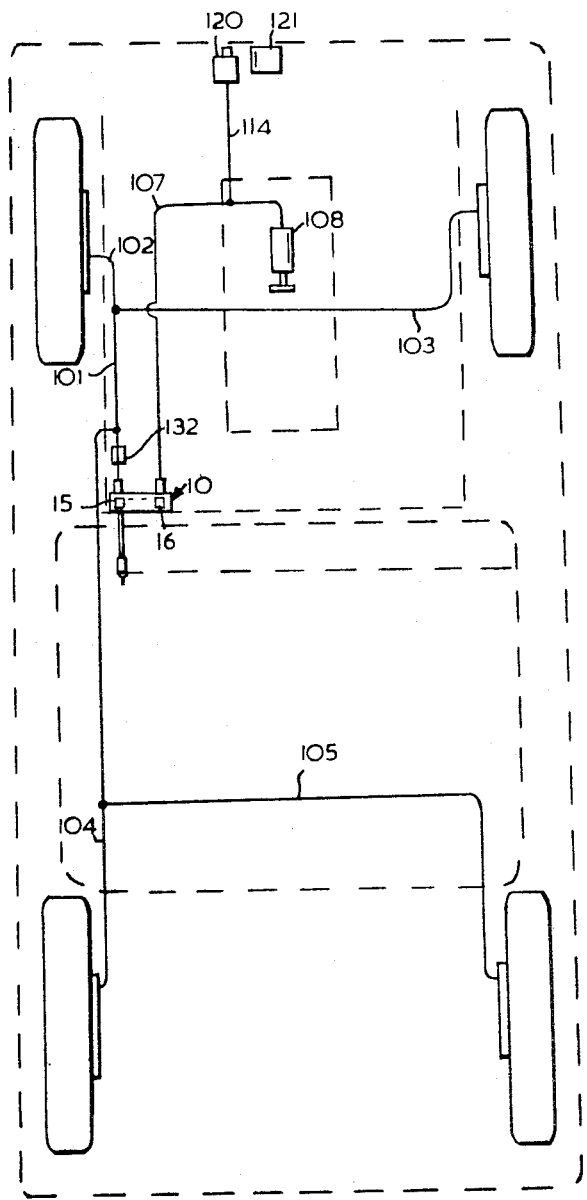
FIG. 5 is a diagrammatic top plan view of the antitheft apparatus including hydraulic lines connected to hydraulically operated hood latches and the brakes of the vehicle.
Figure 11:
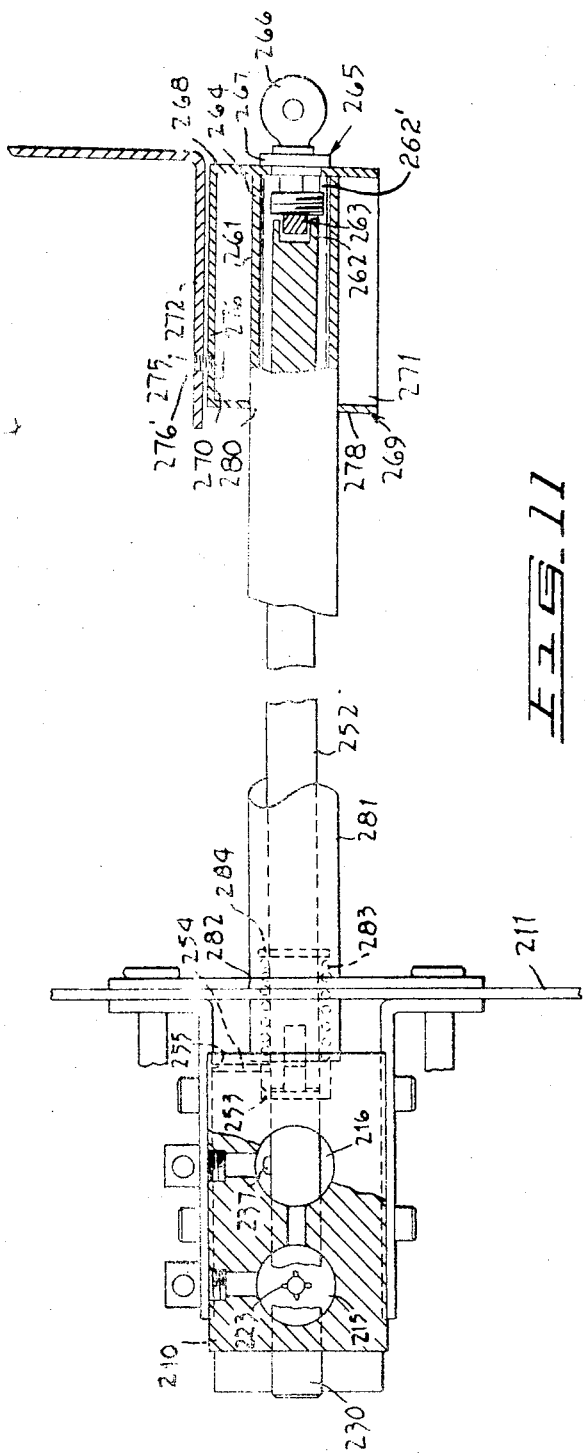
FIG. 11 is a partly sectional side elevation view of the control box shaft and lock of the antitheft device in accordance with this invention.

Referring now to FIGS. 5, 6 and 11, it will be noted that the valves 15 and 16 are provided at their lower ends with suitable couplings 90 and 91 to which hydraulic lines 92 and 93 are connected. The hydraulic lines 92 and 93 are in turn connected by means of a T-fitting 94 to a hydraulic line 95 connected to the vehicle's master brake cylinder 96.

The other side of valve 15 is provided with a coupling 100 which is in turn secured to a hydraulic line 101 connected to brake lines 102, 103, 104 and 105 which operate the brakes of the four wheels of the vehicle.

Figure 10:
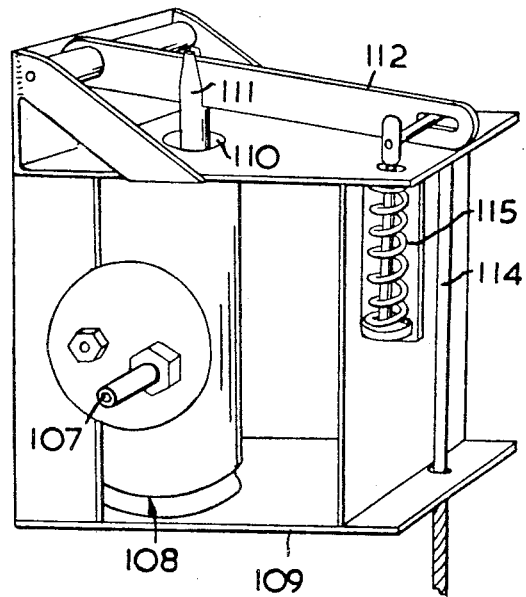
FIG. 10 is a perspective view of an hydraulic piston cylinder assembly adapted to operate the hood latch.

The other side of valve 16 has a coupling 106 to which a hydraulic line 107 is connected. The other end of the hydraulic line 107 is connected to a hydraulic piston cylinder assembly 108 shown more clearly in FIG. 10.

The hydraulic piston cylinder assembly 108 which may be a conventional brake cylinder is mounted in a housing 109 which is preferably secured to the vehicle's engine block. The housing 109 has an aperture 110 therein through which the piston 111 extends to engage a tiltable arm 112. A Bowden cable is secured to the housing 109 and the inner core thereof is secured to and movable with the tiltable arm 112. The other end of the Bowden cable 114 is connected to a spring-loaded latch 120 adjacent a conventional hood latch 121, both of which are adapted to engage the hood of the motor vehicle in a conventional manner. A return spring 115 is also secured to the free end of the tiltable arm 112.

Turning now to the electrical connections, these are best illustrated by reference to FIGS. 6, 8 and 9. The contact plate 45 is provided with three electrical leads 125, 126 and 127 electrically connected thereto.

Figure 8:
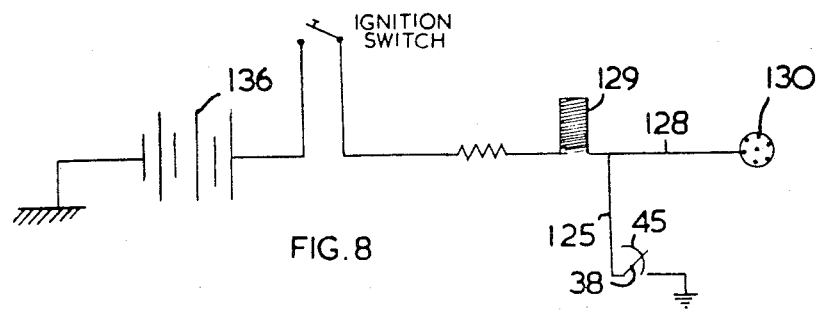
FIG. 8 is a schematic illustration of the electrical connections between a switch in the control box and the ignition systems of the vehicle.

As shown in FIG. 8, the electrical lead 125 is connected to the electrical cable 128 interconnecting the coil 129 and the distributor 130 of the motor vehicle. It will be appreciated that the control box 10 is electrically grounded by virtue of being secured to the firewall 11 of the motor vehicle and therefore, the pin 38 carried by the arm 24 will ground the contact plate 45 when it is in contact therewith.

Figure 9:
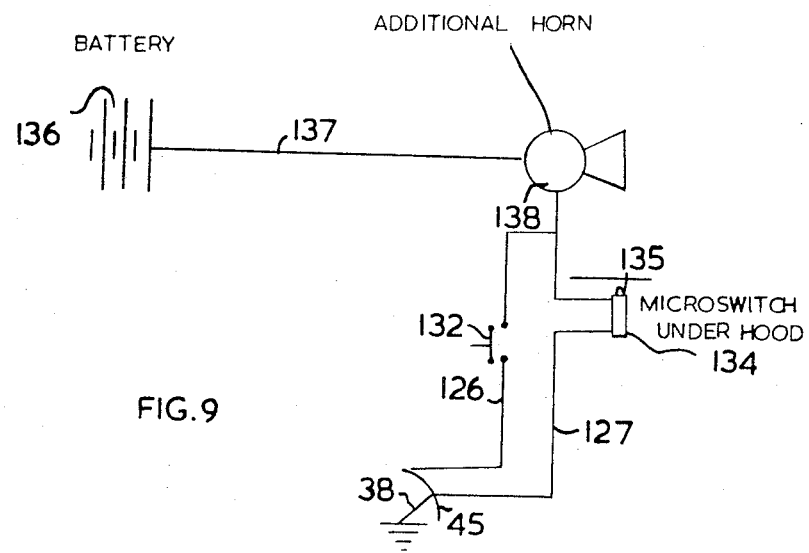
FIG. 9 is a schematic illustration of the electrical connections between the switch in the control box and a pressure switch under the vehicle's hood adapted to operate the horn.

As shown in FIG. 9, a lead 127 is connected to a microswitch 134. The microswitch 134 is secured in such a position that the hood of the motor vehicle normally depresses the plunger 135 thereof in which position the contacts of the switch 134 are open. The switch 134 is in turn connected to a horn 138 in the engine compartment secured to and insulated from the body of the vehicle. A lead 137 connects the horn 138 to the battery 136 of the vehicle.

The lead 126 of the contact plate 45 described with reference to FIG. 6 is connected to a fluid operated pressure switch 132 in the hydraulic line 101 connecting the valve 15 to the brakes of the vehicle. The switch 132 may be of the type normally used to energize a low oil pressure indicator light of motor vehicles. A lead 133 connects the switch 132 to the horn 138. Thus the horn 138 may be connected to ground by either the microswitch 135 or the fluid operated pressure switch 132 when the pin 38 in the control box 10 is in contact with plate 45.

Figure 4:
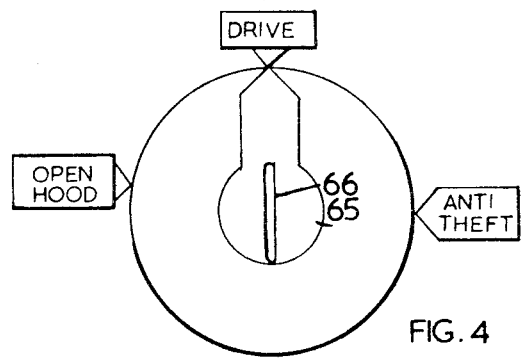
FIG. 4 is a front elevational view of the lock showing in addition the indicator facilitating selection of the various positions of the lock.

In operation, assuming that all the hydraulic and electrical connections have been properly made, and that key 66 is in the drive position shown in FIG. 4, the antitheft apparatus is placed in operation by turning the key 66 fully clockwise to the position shown as antitheft in FIG. 4. Rotating the key and the barrel 64 of the lock 65 in this manner causes the shaft 52 to be rotated thus rotating the stem of the valve 15. The valve 15 closes and thus, if hydraulic fluid has been previously introduced into the brake lines 101, 102, 103, 104 and 105 to apply the brakes of the vehicle, this fluid is retained in the brake lines by the valve 15 and the brakes thus remain applied. Turning the key 66 to the antitheft position, also causes the arm 24 secured to the stem 17 of valve 15 to rotate through approximately 90°. However, due to the lost motion slot 37 in the link 35 interconnecting arms 24 and 25, the arm 25 does not move and valve 16 remains closed. Furthermore, when the key 66 is turned to antitheft, the pin 38 moves onto the contact plate 45 thereby connecting all the leads 125, 126 and 127 to ground. The ignition of the motor vehicle will thus be connected to ground so that the vehicle is inoperative if an unauthorized person manages to close the ignition switch and starter switch. Should an unauthorized person pry the hood of the vehicle open, the plunger 135 of the microswitch 134 will be released causing the contacts of the switch to close and since one side of the switch 135 is connected to ground through lead 127, the horn 138 will be energized.

Furthermore, if a brake line of the motor vehicle is cut to free the brakes, the resulting absence of pressure in the line 101 will cause the contacts of the fluid operated pressure switch 132 to close, the horn 138 will thus be connected to ground and will be energized.

An additional benefit derived from the pressure switch 132 described above is that of providing a convenient means for testing the hydraulic lines and brake cylinders of the motor vehicle. Testing is carried out by introducing fluid into the brake lines 101, 102, 103, 104 and 105 and retaining the fluid therein by closing valve 15 in the manner described above. If any of the lines or cylinders are faulty, the resulting pressure drop will cause the contacts of switch 132 to close and the horn 138 will be energized.

As described above, the hood latch 120 is spring biased so as normally to engage the hood of the vehicle when the hood is closed. In order to release the latch 120, the driver must turn the key 66 counterclockwise to the position indicated as open hood in FIG. 4. Turning the key 66 and shaft 52 causes the valve stem 17 and the associated arm 24 to move counterclockwise through 90° from the upright position, thus the link 35 causes the arm 25 on the valve 16 to be moved a similar distance. The valve 16 is now almost fully open and hydraulic fluid can be forced from the master cylinder 96 through the lines 95, 94, 93 and 107 to the piston cylinder assembly 108. The piston 110 is moved outwardly causing movement of the free end of the tiltable arm 112 against the force exerted by the return spring 115 and thus moves the core of the Bowden cable 114. The Bowden cable 114 causes the latch 120 to be released.

If it is desirable to retain the hood latches 120 and 121 in the open position, it is possible to return the key 66 to the antitheft position while maintaining pressure on the brake pedal to keep hydraulic fluid in the line 107. Since the valve 16 is closed when the key 66 is in the antitheft position, the hydraulic fluid is retained in the line 107 to maintain the hood latch 120 in the open position. The key 66 is then returned to the drive position to disconnect the microswitch 134 and the horn 138. It is then possible for the driver himself to go to the front of the vehicle and open the hood by releasing latch 121.

In order to reset the hood latches, it is necessary to return the key 66 to the open hood position. This opens the valve 16 releasing pressure in the line 107.

The key is then returned to drive or antitheft depending on whether the vehicle is to be driven or parked.

As it would otherwise be possible for a thief to cut through the tube 81 and the shaft 52 so as to manipulate the elements of the control box 10, the door 54 has been provided and the shaft 52 has been spring loaded.

Thus, if the shaft 52 is cut, the helical spring 83 causes the end of the shaft 52 to be withdrawn from the aperture 53 and the door 54 is allowed to close the aperture 53.

Alternatively, a control box indicated generally at 210 in FIGS. 11, 12, 13 and 16 is adapted to be secured to a firewall 211 within the engine compartment of a motor vehicle.

The control box 210 comprises a block 212 preferably of metal having bores 213 and 214 extending therethrough. A pair of poppet-type valves 215 and 216 are provided in the bores 213 and 214 respectively. The valves 215 and 216 include valve members 217 and 217' slidably mounted in the bores 213 and 214.

Since the valves 215 and 216 are identical, only one of the valves need by described in detail. Accordingly, the valve member 217 has an enlarged head 218 and an integral stem 219. The head 218 of valve member 217 is received in the bore 213 and seats on a shoulder 220 defined by a restriction 222 in the bore 213.

A resilient sealing gasket 221 is preferably provided in a suitable groove in an inner surface of the head 218 to provide a liquidtight seal between the head and the seat.

The stem 219 is guidedly received in the restricted portion 222 of the bore 213. A plurality of passages 223 are provided in the restricted portion 222 to allow fluid to flow past the stem 219 when the valve member 217 is moved away from the seat formed by the shoulder 220.

The portion of the bore 213 which receives the enlarged head of the valve member is preferably the outlet side of the valve 215 as the returning liquid assists in moving the valve member to a closed position.

A helical spring 224 having its one end bearing on the head 218 of valve member 217 biases the valve member 217 toward the shoulder 220. The cap 225 is preferably provided with a conventional sealing gasket 226. The other end of the bore 213 is also provided with a liquidtight plug 227.

The valves 215 and 216 are adapted to be operated by a cam shaft 230 journaled for rotation in a suitable bore 231 in the block 212 and held against axial displacement by retaining elements 232 in a conventional manner. The shaft 230 is also provided with liquidtight seals in the form of O-rings 233 received in suitable grooves at its midportion and adjacent the outer ends thereof.

The shaft has a pair of threaded apertures 234 and 235 extending therethrough to receive machine screws 236 and 237 respectively, which constitute cams adapted to cooperate with the rounded outer ends of the valve stems 219 of the valves 215 and 216 respectively. It will be noted that the apertures 234 and 235 are disposed substantially perpendicularly to each other so that if one of the valves 215 and 216 is opened by the cams 236 and 237, the other remains closed.

Figure 16:
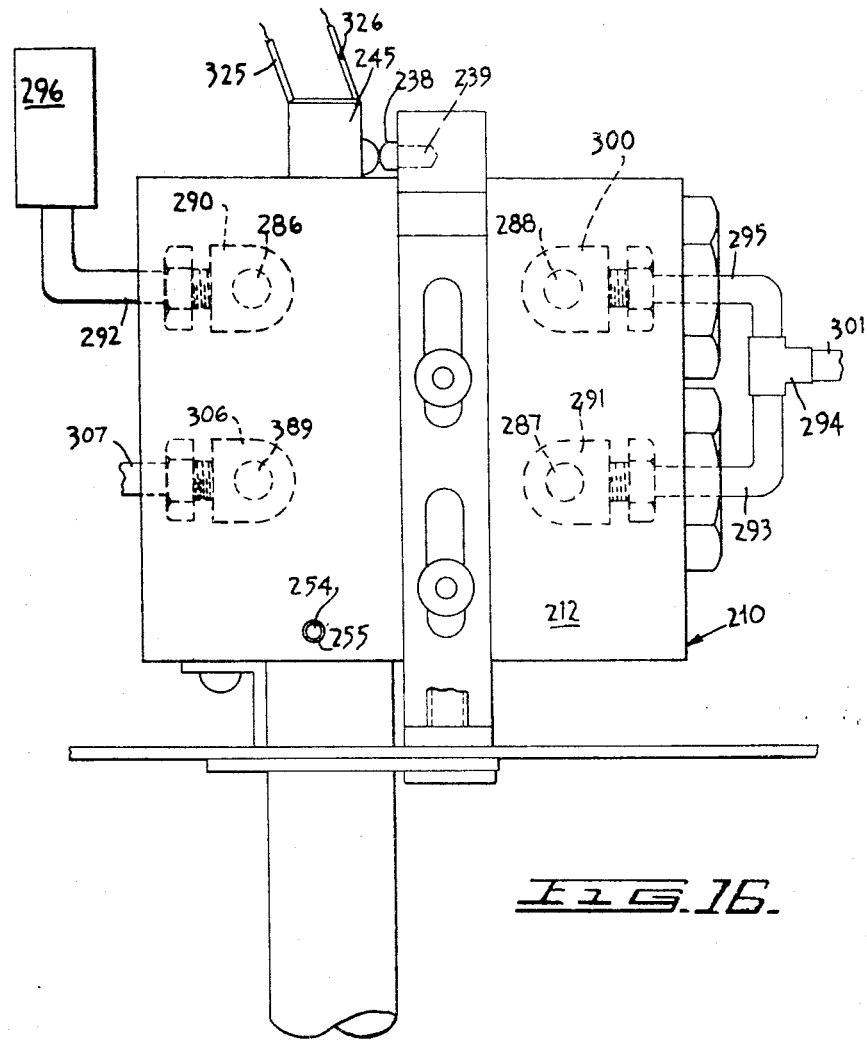
FIG. 16 is a top plan view of the control box of FIG. 1 and the associated electrical and hydraulic connections.

As shown in FIG. 16, the shaft 230 extends beyond the block 212 and a machine screw 238 is received in a threaded aperture 239 therein. The head of screw 238 constitutes a cam adapted to cooperate with and close the contacts of a switch 245 secured to the block 212. Appropriate electrical connections to be made to the switch 245 will be described below with reference to FIGS. 18 and 19.

Figure 12:
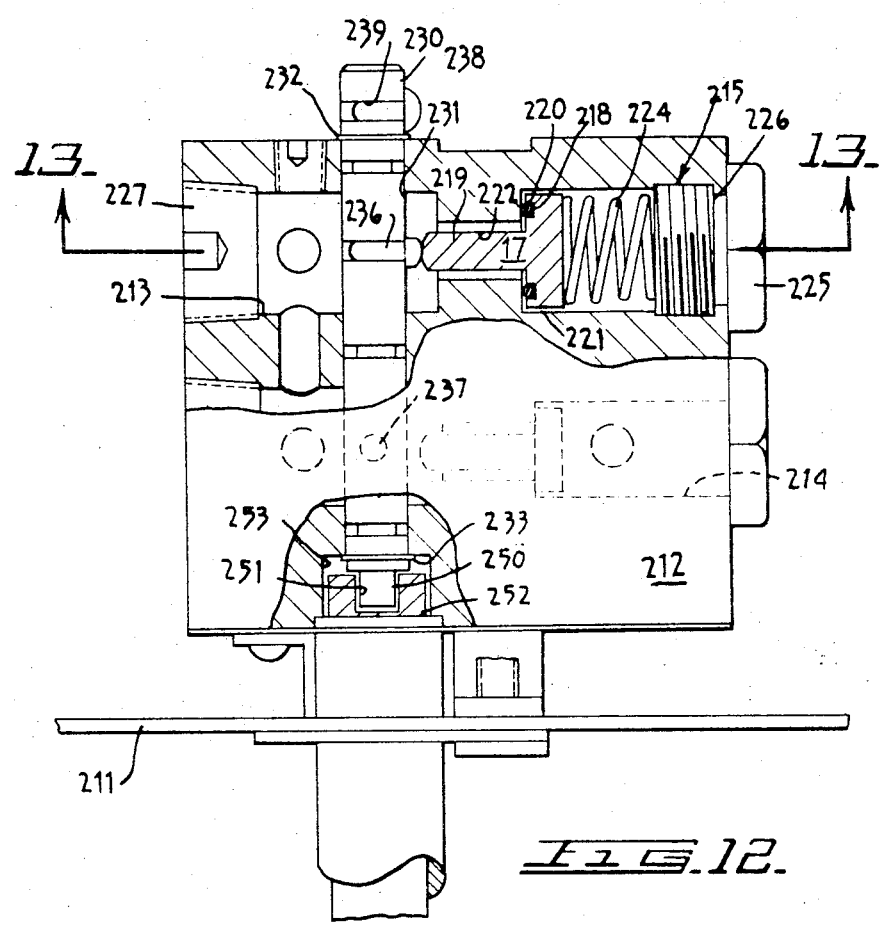
FIG. 12 is a top plan view of the control box of FIG. 1.
Figure 13:
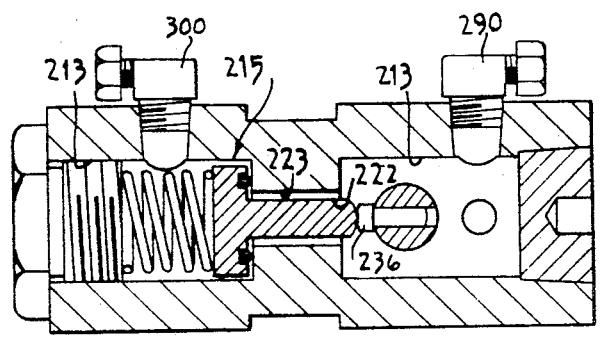
FIG. 13 is a section taken along the line 13-13 of FIG. 2.

As shown in FIGS. 11, 12 and 13, the end of the shaft 230 remote from the switch 245 has a rectangular end portion 250 adapted to be received in a recess 251 in one end of a hardened steel shaft 252 which extends into an enlarged mouth 253 of the bore 231 in the control box 210.

It will be noted (see FIGS. 11, 12 and 16) that the mouth 253 is adapted to be closed by a spring-loaded pin 254 received in an aperture 255 and having its lower end riding on the shaft 252. Accordingly, if the end of the shaft 252 is withdrawn from the mouth 253, the pin 254 will be urged downwardly by the spring thus providing an obstruction to reentry of the shaft 252.

The other end of the shaft 252 is provided with a recess 262 which has a square cross section to cooperate with the end of a rotatable barrel 264 of a lock 265. The barrel 264 of the lock 265 is adapted to be turned by a key 266. The lock 265 is secured in an aperture 267 in an end wall 268 of a box 269 by a nut 263 threadedly received on the body 262' of the lock 265. The box 269 has a bottom 270 and an open top 271 and is inverted so that the bottom 270 is securable to a portion of the instrument panel 272 of the vehicle by a suitable machine screw 275 extending through a suitable elongated aperture 276 in the bottom of the box 269 and into a threaded aperture 276' in the instrument panel 272.

An end wall 278 of the box 269 is provided with an aperture 280 which is aligned with the aperture 267 in the end wall 268. The aperture 280 is adapted to receive a cylindrical tube 281 through which the shaft 252 extends.

The cylindrical tube 281 bears at its one end against the inner surface of the end wall 268 of the box 269. The other end of the tube 281 extends through a suitable aperture 282 in the firewall 211 of the motor vehicle and is welded to the outer surface of the block 212. A helical spring 283 surrounding the shaft 252 bears at its one end against the block 212 and at its other end against a collar 284 carried by the shaft 252.

To install the control box 210, the shaft 252 and the lock 265 of the antitheft device in a motor vehicle, it is necessary to first secure the box 269 containing the lock 265 to the instrument panel 272. Then the tube 281 including the shaft 252 therein is inserted through the firewall 211 so that its free end is received in the box 269. The control box 210 is then secured to the firewall 211.

Figure 15:
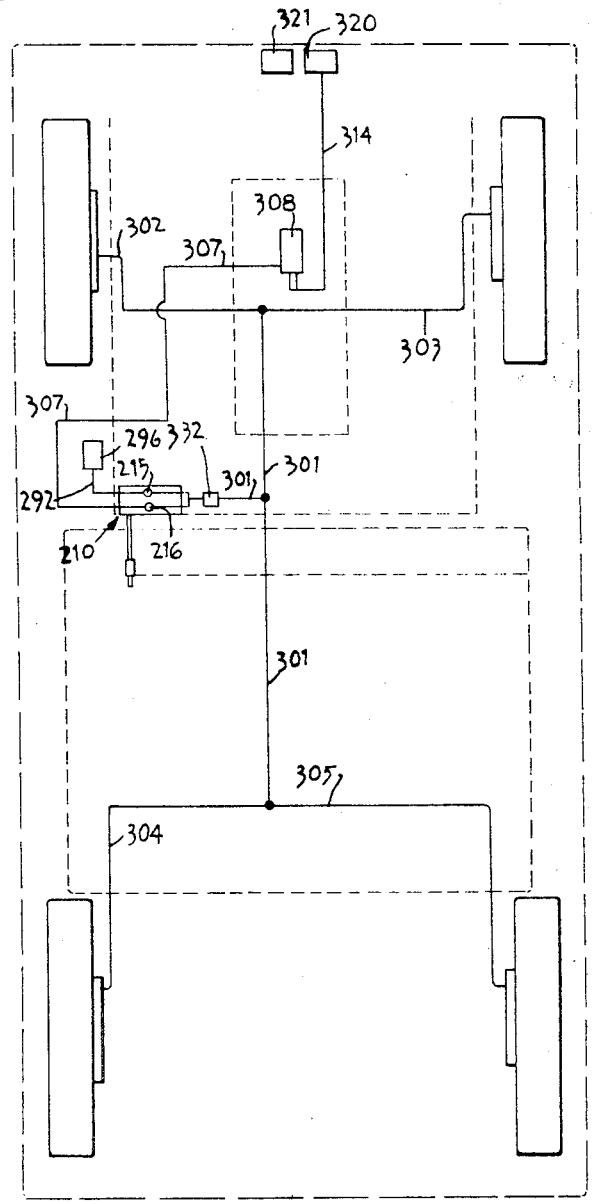
FIG. 15 is a diagrammatic top plan view of the antitheft apparatus including hydraulic line connected to a hydraulically operated hood latch and the brakes of the vehicle.
Figure 20:
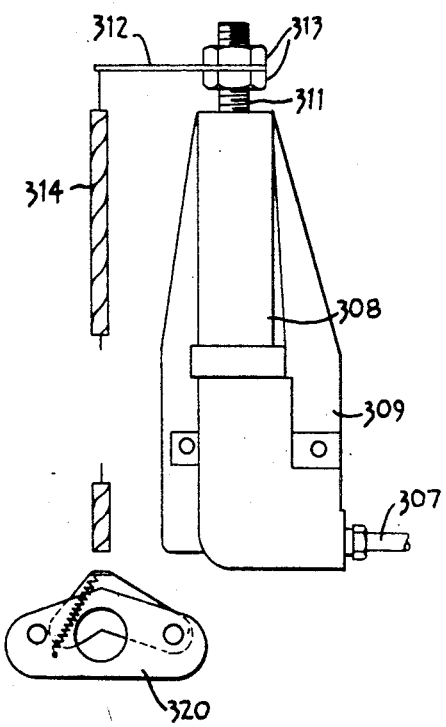
FIG. 20 is a perspective view of an hydraulic piston cylinder assembly adapted to operate a hood latch.

Referring now to FIGS. 15, 16 and 20, it will be noted that the valves 215 and 216 are provided at their inlets 286 and 287 respectively, with suitable couplings 290 and 291 to which hydraulic lines 292 and 293 are connected. The hydraulic line 293 is in turn connected a T-fitting 294. The hydraulic line 292 interconnects the coupling 290 with the vehicle's master brake cylinder 296.

An outlet port 288 of valve 215 is provided with a coupling 300 which is in turn connected by a hydraulic line 295 and T-fitting 294 to a hydraulic line 301 connected to brake lines 302, 303, 304 and 305 which operate the brakes of the four wheels of the vehicle.

An outlet port 289 of valve 216 has a coupling 306 to which a hydraulic line 307 is connected. The other end of the hydraulic line 307 is connected to a hydraulic piston cylinder assembly 308 shown more clearly in FIG. 20.

The hydraulic piston cylinder assembly 308 which may be a conventional cylinder of the type used for hydraulic clutches is mounted on a base 309 which is preferably secured to the vehicle's engine block. The piston cylinder assembly 308 has a piston 311 having a threaded outer end to which a transverse arm 312 is secured by nuts 313. Hydraulic fluid supplied to the assembly 308 through hydraulic line 307 connected to an inlet port thereof, causes the piston 311 to move outwardly and a spring (not shown) in the piston cylinder assembly 308 returns the piston 311 when hydraulic pressure is released.

A Bowden cable 314 is secured to the base 309 and the inner core thereof is secured to and movable with the arm 312. The other end of the Bowden cable 314 is connected to a spring-loaded latch 320 adjacent a conventional hood latch 321, both of which are adapted to engage the hood of the motor vehicle in a conventional manner.

Figure 18:
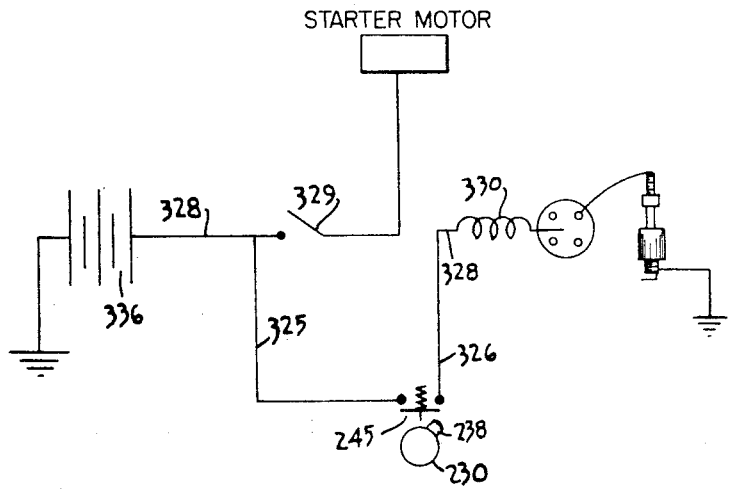
FIG. 18 is a schematic illustration of the electrical connections between a switch on the control box and the ignition system of the vehicle.

Turning now to the electrical connections, these are best illustrated by reference to FIGS. 16, 18 and 19. As illustrated, the vehicle's electrical system includes an ignition switch 329, a coil 330 and a battery 336. The switch 245 is provided with electrical leads 325 and 326 electrically connected thereto and to an electrical cable 328, thus interconnecting the battery 336 and the coil 330 through the ignition switch 329.

Figure 19:
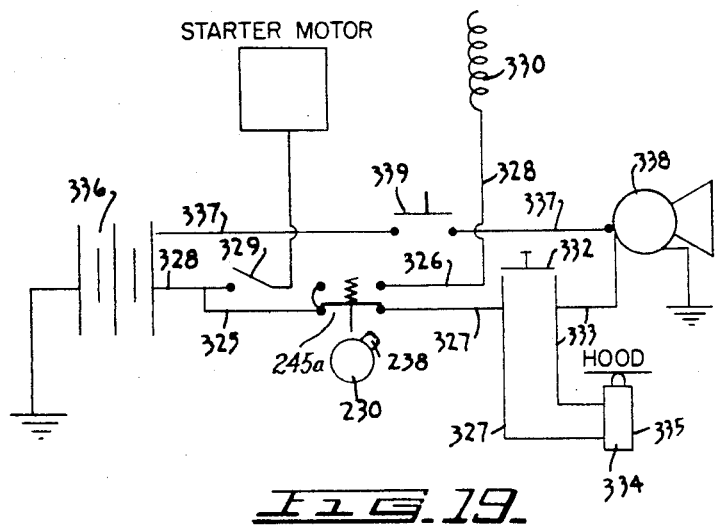
FIG. 19 is a schematic illustration of the electrical connections between the switch in the control box and a pressure switch under the vehicle's hood adapted to operate the horn.

Alternatively, as shown in FIG. 19, the switch 245a is a two-pole double-throw-type switch which has a further lead 327 connected to a microswitch 334. As described above, the lead 325 connects the switch 245 to the battery 336. The microswitch 334 is secured in such a position that the hood of the motor vehicle normally depresses the plunger 335 thereof in which position the contacts of the switch 334 are open. The switch 334 is in turn electrically connected to a horn 338 in the engine compartment secured to the body of the vehicle. A lead 337 connects the horn 338 to battery 336 of the vehicle through a conventional horn actuating switch 339. The lead 327 of the switch 245a is also connected to a fluid operated pressure switch 332 in the hydraulic line 301 connecting the valve 215 to the brakes of the vehicle. The switch 332 may be of the type normally used to energize a low oil pressure indicator light of motor vehicles. The lead 333 also connects the switch 332 to the horn 338. Thus the horn 338 may be connected to the battery 336 by either the microswitch 334 or the fluid operated pressure switch 332 when the switch 245a completes the circuit between lines 325 and 327.

Figure 21:
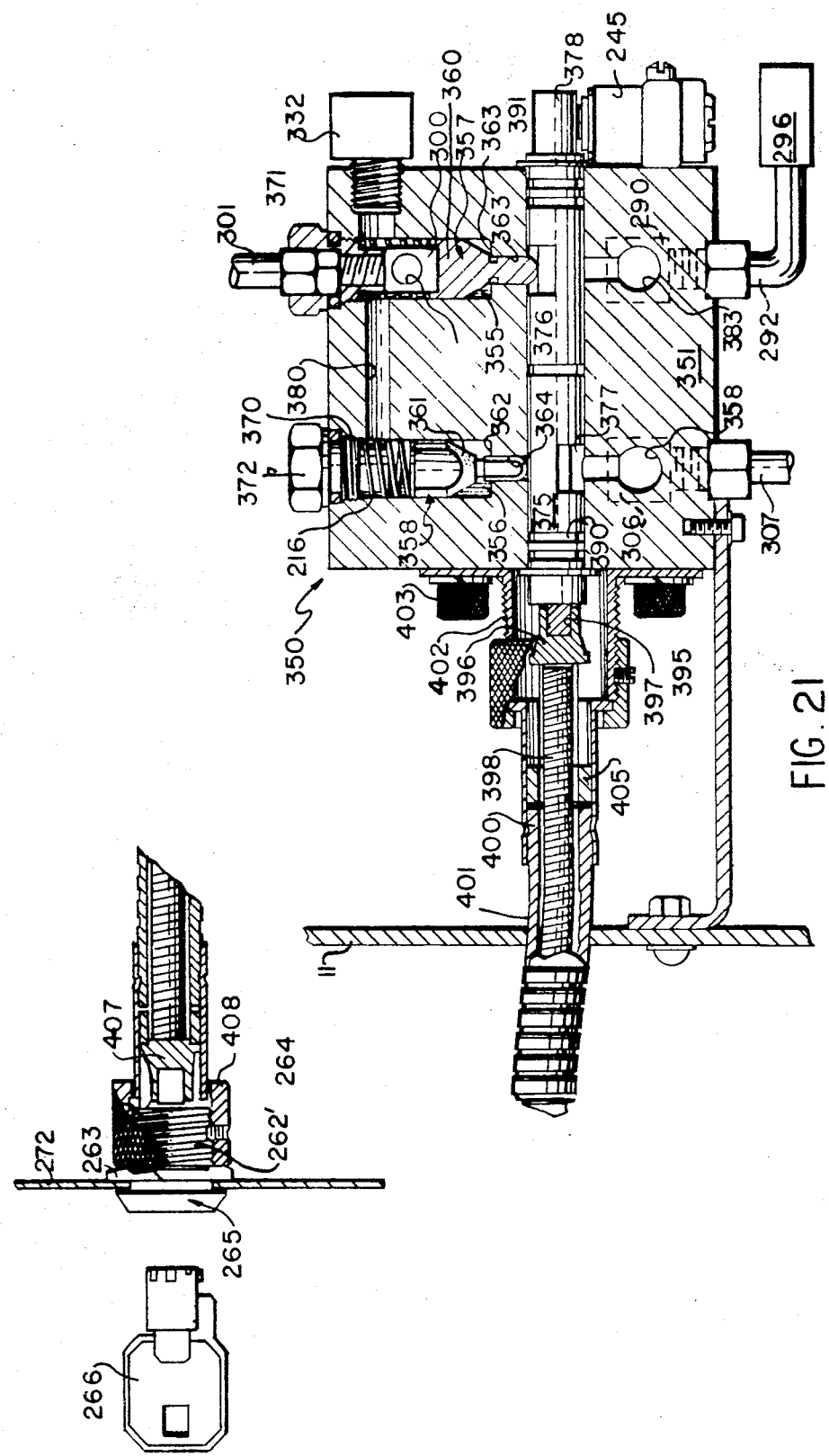
FIG. 21 is a partly sectional top plan view of an alternative embodiment of the antitheft apparatus.
Figure 22:
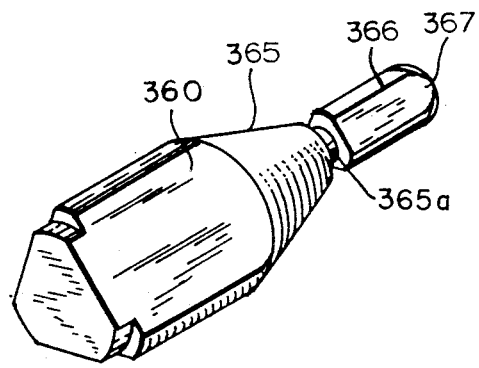
FIG. 22 is a perspective view of a valve member of the embodiment of FIG. 11.
Figure 23:
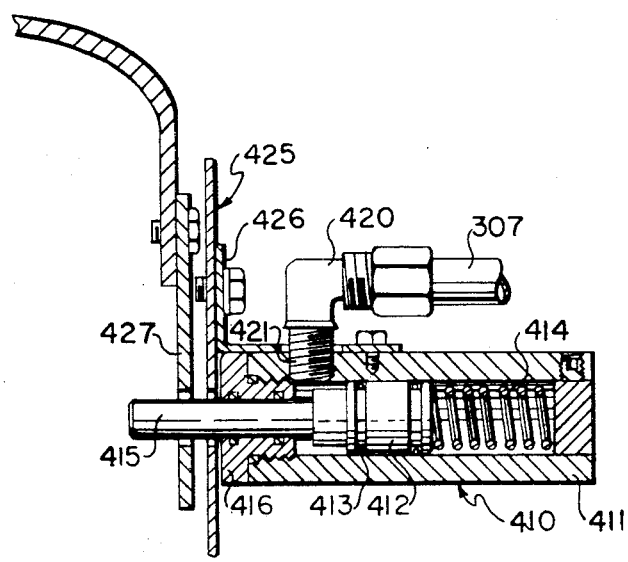
FIG. 23 is a sectional side elevational view of an alternative construction of an hydraulic piston cylinder assembly adapted to latch the hood of the vehicle.

Referring now to FIGS. 21, 22 and 23 wherein an alternative of a control box is indicated generally at 350, the control box 350 is disposed within the engine compartment of a vehicle and is secured to the firewall 211.

The control box 350 comprises a block 351 similar to the block 212 with the exception that bores 355 and 356 do not extend therethrough. A pair of valves 357 and 358 are provided in the bores 355 and 356 respectively, and include valve members 360 and 361 of the type known as needle valves. The valve members 360 and 361 seat on shoulders 362 and 363 defined by inner portions 363a and 364 of reduced diameter of the bores 355 and 356 respectively.

As the valve members 360 and 361 are identical, only one need be described in detail. Accordingly, as shown more clearly in FIG. 22, the valve member 360 is substantially triangular in cross section and has a frustoconical portion 365 which seats on the shoulder 362. Extending from the frustoconical portion 365 is a narrow neck portion 365a and a portion 366 of reduced diameter which is received in the inner portion 363a of the bore 355. A rounded outer end 367 is provided on the reduced portion 366 of the valve member 360.

Springs 370 and 371 and threaded caps 372 and 373 similar to those described with reference to FIGS. 11 and 20 are also provided.

The control box 350 is also provided with a cam shaft 375 adapted to operate the valves 357 and 358. The cam shaft 375 is similar to the shaft 230 described above with the exception that eccentric cams 376, 377 and 378 of lesser diameter than the shaft itself are provided in place of the machine screws 236, 237 and 238, described above, to operate the valves 360 and 361 and the switch 245a.

It will also be noted that the bores 355 and 356 are interconnected by a passage 380 thus eliminating the need for the T-fitting 294 described above with reference to FIG. 16.

Hydraulic fluid is supplied to the inlet of both valves 357 and 358 through the coupling 290 (shown in phantom) threadedly received in a bore 383 in the block 351. The hydraulic line 292 from the master cylinder 296 (see FIGS. 15 and 16) is connected to the coupling 290.

Outlet ports of the valves 357 and 358 comprising bores 357' and 358' which communicate with the bores 355 and 356, threadedly receive the couplings 300 and 306 described with reference to FIG. 16.

It will be noted that the cam shaft 375 is provided with O-ring-type seals 390 and retaining elements in the manner described with reference to FIGS. 11 and 12. A square end portion 395 of the shaft 375 at the end remote from cam 378 is adapted to receive thereon a fitting 396 having a mating recess 397 therein. The fitting 396 is swaged to one end of the inner core 398 of a conventional flexible shaft assembly 400. The flexible shaft assembly 400 also includes sheath 401.

A flanged coupling assembly 402 secured to the block 351 as by machine screws 403 secures the sheath 401 to the block 351.

It will be noted that a collar 405 carried by and secured to the fitting 396 prevents withdrawal of the core 398 in one direction. The core 398, however, is free to slide through the collar 405 until the fitting 396 engages the collar.

A fitting 407 similar to fitting 396 is provided on the other end of the core 398 to cooperate with the end of the rotatable barrel 264 of the lock 265 described with reference to FIG. 11. It will be apparent, however, that the lock 265 of this embodiment is secured directly to the instrument panel 272 thus eliminating the box 269. A coupling including a collar 408 threadedly received on the body 262 of the lock 265 secures the sheath 401 to the lock 265.

A setscrew threadedly received in a suitable aperture in the collar 408 bears against the body 262' of the lock to prevent uncoupling of the shaft assembly 400 and the lock. The head of the setscrew is preferably filled or otherwise leveled to prevent its removal.

Referring now to FIG. 23 a piston cylinder assembly adapted to lock the hood of a vehicle is indicated generally at 410 and includes a cylinder body 411, a piston 412 slidable therein and biased outwardly by a helical spring 414.

An extension 415 of the piston 412 extends through an apertured member 416 threadedly received in the open end of the cylinder body 411. Suitable O-ring seals 413 are provided on the piston 412 and on the member 416. The piston 412 is adapted to be driven into the cylinder 411 by hydraulic fluid supplied through a coupling 420, threadedly received in a bore 421 and communicating with the interior of the cylinder 411. The hydraulic line 307 is connected to the coupling 420 and to coupling 306 or either the control box 210 or the alternative embodiment of the control box 350.

The assembly 410 is mounted by means of a bracket 426. The piston extension 415 extends through an aperture in the fender 425 and through an aligned aperture in a plate 427 bolted or otherwise secured to the hood of the vehicle.

Figure 14:
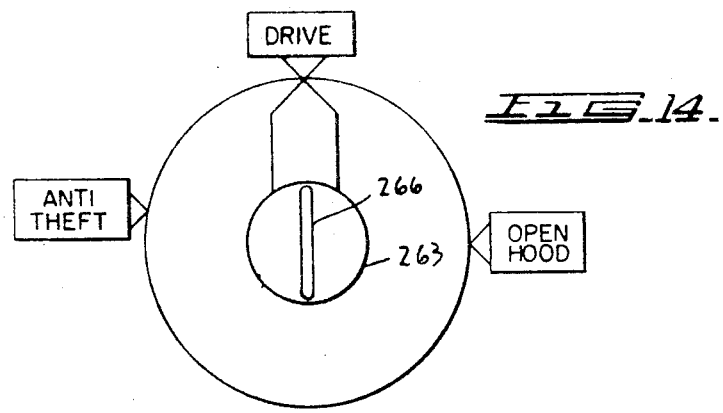
FIG. 14 is a front elevational view of the lock showing in addition the indicator facilitating selection of the various positions of the lock.

In operation, assuming that all the hydraulic and electrical connections have been properly made, and that key 266 is in the drive position shown in FIG. 14, the antitheft apparatus is placed in operation by turning the key 266 fully clockwise to the position shown as antitheft in FIG. 14. In the embodiments of FIGS. 11—20, rotating the key and the barrel 264 of the lock 265 in this manner causes the shaft 252 to be rotated thus rotating the camshaft 230 so that cam 236 no longer contacts the stem of the valve 215. The valve 215 closes due to the pressure exerted by the spring 224 and thus, if hydraulic fluid has been previously introduced into the brake lines 301, 302, 303, 304 and 305 to apply the brakes of the vehicle, this fluid is retained in the brake lines by the valve 215 and the brakes thus remain applied. Turning the key 266 to the antitheft position also causes the cam 237 on the shaft 230 associated with valve 216 to rotate through approximately 90°. However, due to the relative positions of cams 236 and 237, valve 216 remains closed. Furthermore, with reference to FIGS. 16 and 18, when the key 266 is turned to antitheft the cam 238 moves out of contact with the plunger of the switch 245 thereby disconnecting the leads 325 and 326. The ignition circuit of the motor vehicle will thus be open so that the vehicle is inoperative if an unauthorized person manages to close the ignition switch and starter switch. If the vehicle is equipped with the embodiment of FIG. 19, the switch 245a connects the lead 327 to the lead 325 when in the antitheft position. Should an unauthorized person pry the hood of the vehicle open, the plunger 335 of the microswitch 334 will be released causing the contacts of the switch to close and since one side of the switch 334 is connected to the battery 336 through lead 325, the horn 338 will be energized.

Furthermore, if a brake line of the motor vehicle is cut to free the brakes, the resulting absence of pressure in the line 301 will cause the contacts of the fluid operated pressure switch 332 to close, the horn 338 will thus be connected to the battery 336 and will be energized.

An additional benefit derived from the pressure switch 332 described above is that of providing a convenient means for testing the hydraulic lines and brake cylinders of the motor vehicle. Testing is carried out by introducing fluid into the brake lines 301, 302, 303, 304 and 305 and retaining the fluid therein by closing valve 215 in the manner described above. If any of the lines or cylinders are faulty, the resulting pressure drop will cause the contacts of switch 332 to close and the horn 338 will be energized.

Figure 17:
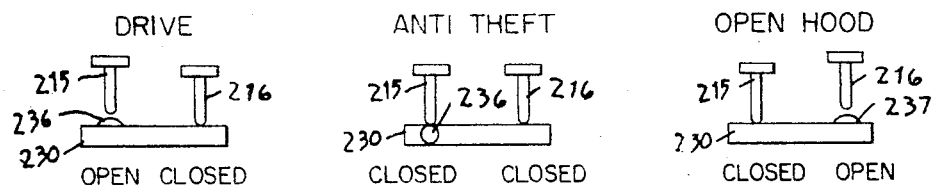
FIG. 17 is a diagrammatic representation of the various positions of the valves and linkage of FIG. 6.

As described above, the hood latch 320 is spring biased so as normally to engage the hood of the vehicle when the hood is closed. In order to release the latch 320, the driver must turn the key 266 clockwise to the position indicated as open hood in FIG. 14. As illustrated in FIG. 17, turning the key 266 and shaft 252 causes the camshaft 230 and the cam 237 associated with valve 216 to move clockwise through 90° to engage the valve stem thereby raising it off the valve seat. The valve 216 is now open and hydraulic fluid can be forced from the master cylinder 296 through the one-way valve 215 and the lines 295, 293 and 307 to the piston cylinder assembly 308. The piston 310 is moved outwardly causing movement of the tiltable arm 312 against the force exerted by the return spring within the assembly 308 and thus moves the core of the Bowden cable 314. The Bowden cable 314 causes the latch 320 to be released. If the vehicle is equipped with the alarm device shown in FIG. 19 it is desirable to maintain the hood latch 320 in the open position while disconnecting the horn 338. This can be done by maintaining pressure on the brake pedal to keep hydraulic fluid trapped in the line 307 while the key 266 is returned to the drive position to disconnect the microswitch 334 and the horn 338. When the hood has been opened the brake pedal may be released. However, to close the hood again, it will be necessary to turn the key 266 to the open hood position so as to open valve 216 and allow fluid pressure in the line 307 to withdraw the latch 320 while the hood is being closed. Thus the hood latch 320 is again maintained in the open position by the one way valve 215 because fluid is trapped in the line 307.

In order to reset the hood latches, it is necessary to return the key 266 to the drive position. This opens the valve 215 and allows the valve 216 to be opened by fluid pressure thereby releasing pressure in the line 307.

As it would otherwise be possible for a thief to cut through the tube 281 and the shaft 252 so as to manipulate the elements of the control box 210, the pin 254 has been provided and the shaft 252 has been spring loaded.

Thus, if the shaft 252 is cut, the helical spring 283 causes the end of the shaft 252 to be withdrawn from the aperture 253 and the pin 254 is allowed to close the aperture 253.

It will be noted that the existing ignition switch 329 of the vehicle no longer controls the ignition circuit. The ignition switch 329 only controls the starting motor. This feature serves a dual purpose. Firstly, the driver cannot start the car unless the lock 265 of the antitheft device has been turned to the drive position indicated in FIG. 14 in which position the valve 215 is open and the brakes of the vehicle are released. Secondly, the lock 265 must be turned to the antitheft position wherein the switch 245 opens the circuit between the battery 336 and the coil 330 in order to shut off the engine of the vehicle. As a result the driver is reminded to use the hydraulic antitheft system to lock the vehicle.

Operation of the embodiments of FIGS. 21, 22 and 23 is substantially the same as the embodiment of the preceding FIGS. of the drawings. Briefly, the core 398 of the shaft assembly 400 is rotated by the key 266 and the rotatable lock barrel 264 and in turn rotates the camshaft 375. One or the other of the valves 357 and 358 is thus opened or allowed to close by the eccentric cams 376 and 377 respectively. The contacts of the switch 245 are similarly opened or closed by the cam 378. In this manner, the same results are obtained in the various positions of the lock 265 as described with reference to the preceding FIGS. of the drawings.

It will be noted, however, that in the embodiment of FIGS. 21 and 22, no mechanism comparable to the pin 254 is provided to prevent reinsertion of the shaft 398, nor is the shaft 398 provided with a spring comparable to the spring 283 described above. This was considered to be unnecessary due to the resilience of the inner core 398 and the close fit of the squared end 395 of shaft 375 and the fitting 396. Thus, if the shaft assembly 400 is severed, the fitting 396 will be dislodged from the shaft end 395. The core 398 cannot be withdrawn due to the collar 405 and the core 398 is too flexible to permit the end fitting 396 to be readily aligned with the shaft end 395.

Similarly, the operation of the cylinder assembly 410 of FIG. 23 will be readily apparent. Hydraulic fluid is supplied through line 307 when the key 266 is turned to the open hood position and the brake pedal depressed, thus causing the piston 412 to be driven into the cylinder body 411 so as to free the plate 427 and the hood of the vehicle.

I claim:

1. An antitheft apparatus for use with a vehicle having fluid operated brakes, said apparatus comprising a first valve adapted to retain fluid in brake lines of said vehicle whereby said brakes remain applied while said vehicle is unattended, a second valve connected to a brake line of said vehicle and to a fluid operated latch engaging the hood of said vehicle, whereby said second valve when closed is adapted to prevent operation of said latch, and key-operated lock means for controlling the opening and closing of said first and second valves.

2. An antitheft apparatus adapted to be secured within the engine compartment adjacent the firewall of a motor vehicle having fluid operated brakes, said apparatus comprising: a lock having a rotatable barrel, a shaft adapted to rotate with said barrel, said shaft extending through the firewall, a first valve having a stem adapted to be rotated by said shaft, said first valve being adapted to control the supply of fluid to the brakes of said vehicle, a second valve connected to the supply of fluid and having a stem adapted to be rotated by linkage means connected to said stem of said first valve, said linkage being so arranged that in one position said second valve remains closed while said first valve is open, and in another position opens when said first valve is closed, a fluid operated latch in said engine compartment adapted to normally retain the hood of said vehicle in a closed position, said latch being adapted to be released by hydraulic fluid supplied thereto through said second valve.

3. An antitheft apparatus for use in a motor vehicle having fluid operated brakes, a source of pressure and a conduit from the source of pressure to the brakes, a second conduit interconnecting said source of fluid and a fluid operated hood latch, said apparatus comprising a shaft, a normally closed first valve so positioned in said conduit as normally to prevent release of said brakes when said brakes have been applied, first valve actuating means associated with said shaft and operating to open said first valve; a second normally closed valve in said second conduit, said second valve being so positioned as normally to prevent release of said hood latch; second valve actuating means to open said second valve;

means interconnecting said first valve actuating means and said second valve actuating means; and locking means to prevent rotation of said shaft whereby said first valve is prevented from being moved to an open position to allow return of fluid trapped in said first conduit, and whereby said second valve is prevented from being moved to an open position by said shaft to allow fluid to pass through said second conduit to release said hood latch.

4. An antitheft apparatus as claimed in claim 3 including a first switch, the contacts of which are closed as said first key-operated valve is closed, one side of said first switch being electrically connected to the vehicle body, so as to be electrically connected to one side of the vehicle's electrical supply, an electrically operated horn insulated from said vehicle and connected to the other side of the vehicle's electrical power supply, a pressure operated second switch, the contacts of which are held open by the closed hood of the vehicle, said second switch being electrically connected to said horn and said first switch, whereby opening said hood and thus closing the contacts of said second switch while the contacts of said first switch are closed causes said horn to be electrically connected to said one side of said vehicle's electrical supply so as to be energized.

5. An antitheft apparatus as claimed in claim 4, wherein said first switch electrically connects the distributor of said motor vehicle to ground when the contacts of said first switch are closed.

6. An antitheft apparatus as claimed in claim 3 for use with a vehicle having a power supply and an electrically operated horn wherein a first switch is electrically connected to said horn and to said power supply, said switch being adapted to be actuated so as to energize said horn when said first key operated valve is closed, a pressure operated second switch the contacts of which are held open by the closed hood of the vehicle, said second switch being electrically connected to said first switch and to said horn, whereby, opening said hood causes the contacts of said second switch to close and when said first switch has also been actuated, said horn will be energized.

7. An antitheft apparatus for use in a motor vehicle having fluid operated brakes, a source of pressure and a first conduit from the source of pressure to the brakes, a second conduit interconnecting said source of fluid and a fluid operated hood latch, said apparatus comprising a shaft, a normally closed first valve so positioned in said first conduit as normally to prevent release of said brakes when said brakes have been applied, a first valve actuating means actuated by said shaft and operative to open said first valve; a second normally closed valve in said second conduit said second valve being so arranged as normally to prevent release of said hood latch; and second valve; and locking means to prevent rotation of said shaft whereby said first valve is prevented from being moved to an open position to allow return of fluid trapped in said first conduit, and whereby said second valve is prevented from being moved to an open position by said shaft to allow fluid to pass through said second conduit to release said hood latch.

8. An antitheft apparatus as claimed in claim 7 wherein said first and second actuating means each comprise a cam means on said shaft adapted to move said first and second valves radially outwardly to an open position.

9. An antitheft apparatus as claimed in claim 7 including a switch provided in the ignition circuit of said vehicle the contacts of said switch being normally open and further actuating means on said shaft for closing said contacts of said switch when said first valve is in said open position.

10. An antitheft apparatus as claimed in claim 7 including a two-pole double-throw switch, one set of contacts of which are normally open provided in the ignition circuit of said vehicle so that said normally open contacts open said ignition circuit, said one set of contacts being adapted to be closed by further actuating means on said shaft when said first valve is in said open position and another set of contacts on said switch adapted to be normally closed, said other contacts interconnecting a power supply and a second switch the contacts of which are adapted to be held open by the vehicle's hood when said hood is in its closed position, said contacts of second switch when closed completing a circuit to an electrically operated horn.

11. An antitheft apparatus as claimed in claim 10 including a pressure operated switch the contacts of which are held open by hydraulic fluid from said first conduit when fluid is trapped therein by said first valve, said pressure operated switch completing a circuit from said power supply through said first switch to said horn when said trapped fluid is allowed to escape thereby causing the contacts of said pressure switch to close.

12. An antitheft apparatus as claimed in claim 7 including a second shaft adapted to form an extension of said first shaft thereby interconnecting said locking means and said first shaft, said second shaft being flexible and resilient and having a flexible outer sheath.